Nov. 8, 1966  L. KING  3,284,015
WEB REGISTRATION AND TENSIONING MEANS
Filed April 13, 1964  3 Sheets-Sheet 2
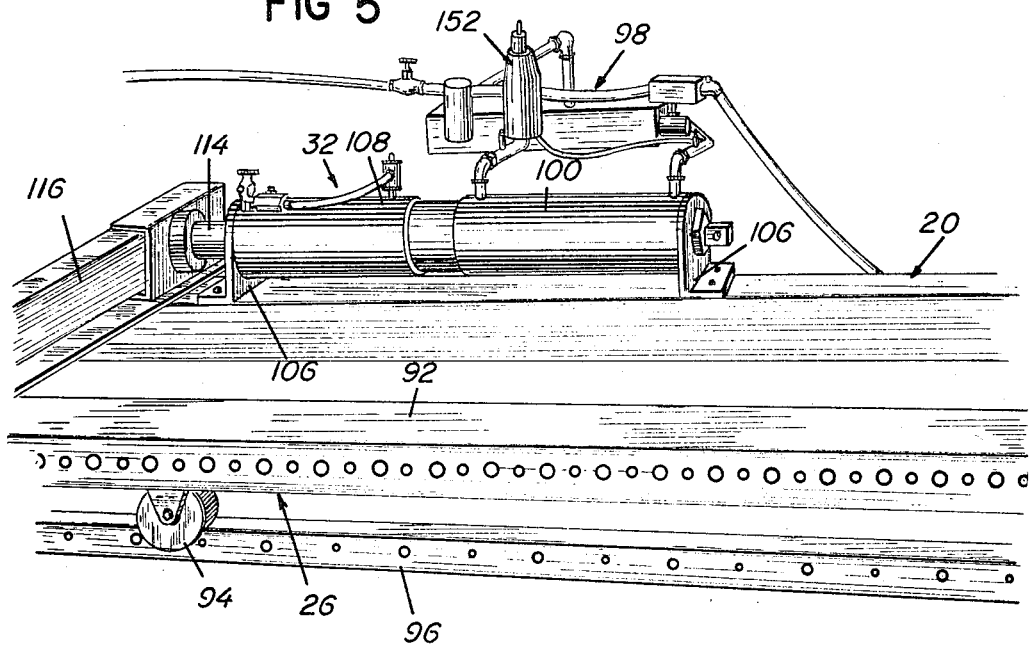
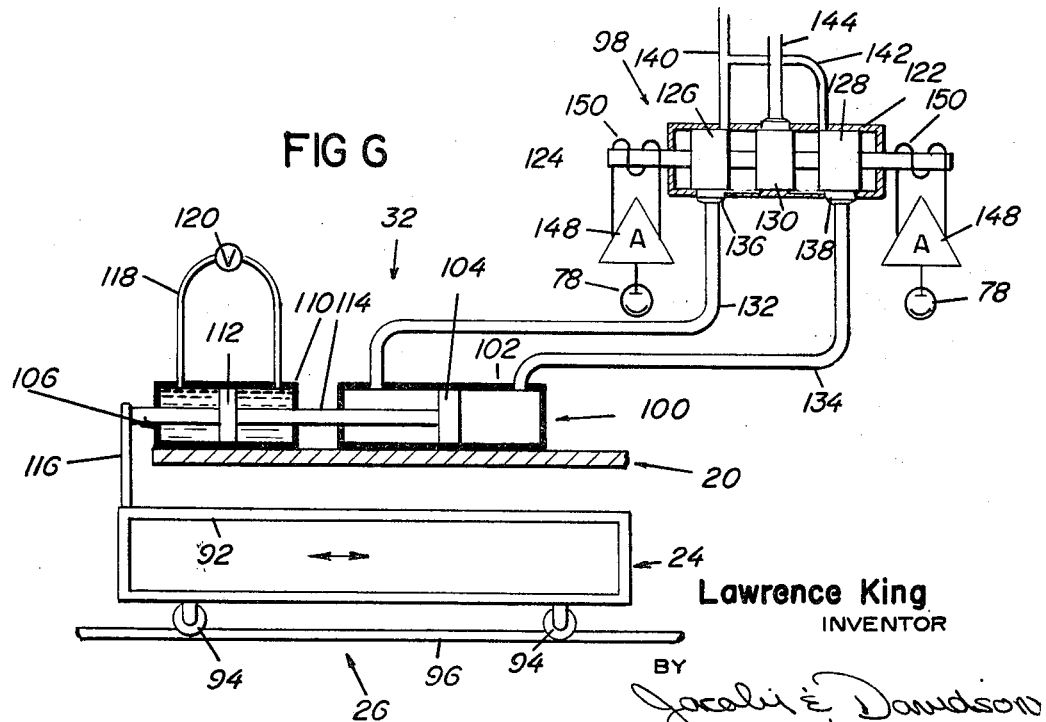
Lawrence King
INVENTOR
BY
Jacolyn E. Davidson
ATTORNEYS Nov. 8, 1966 L. KING 3,284,015
WEB REGISTRATION AND TENSIONING MEANS
Filed April 13, 1964 3 Sheets-Sheet 3
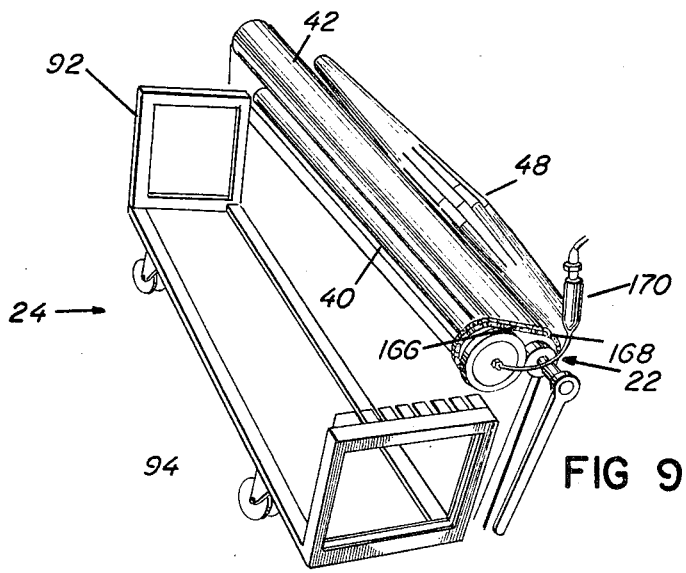
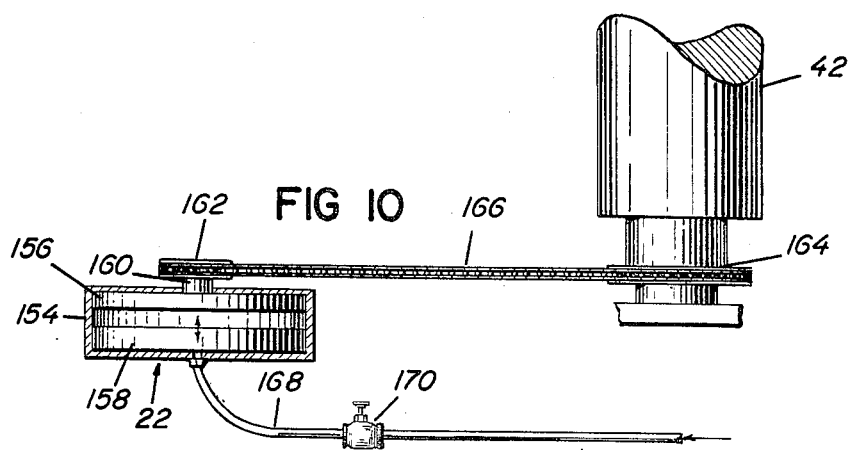
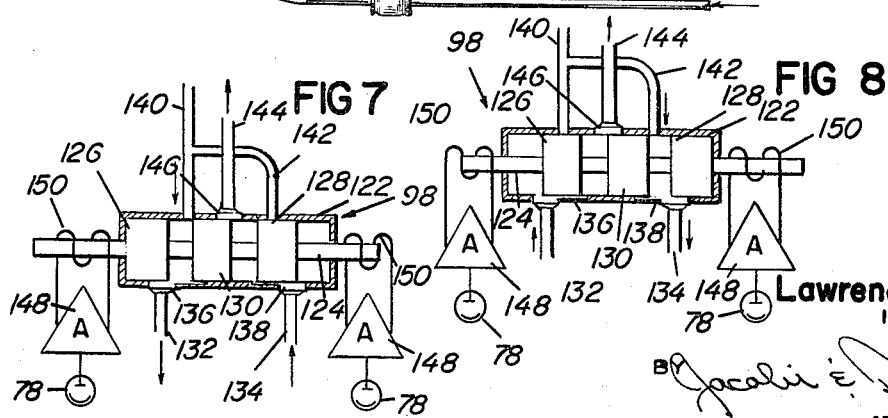
Lawrence King
INVENTOR
ATTORNEYS

United States Patent Office 3,284,015
Patented Nov. 8, 1966

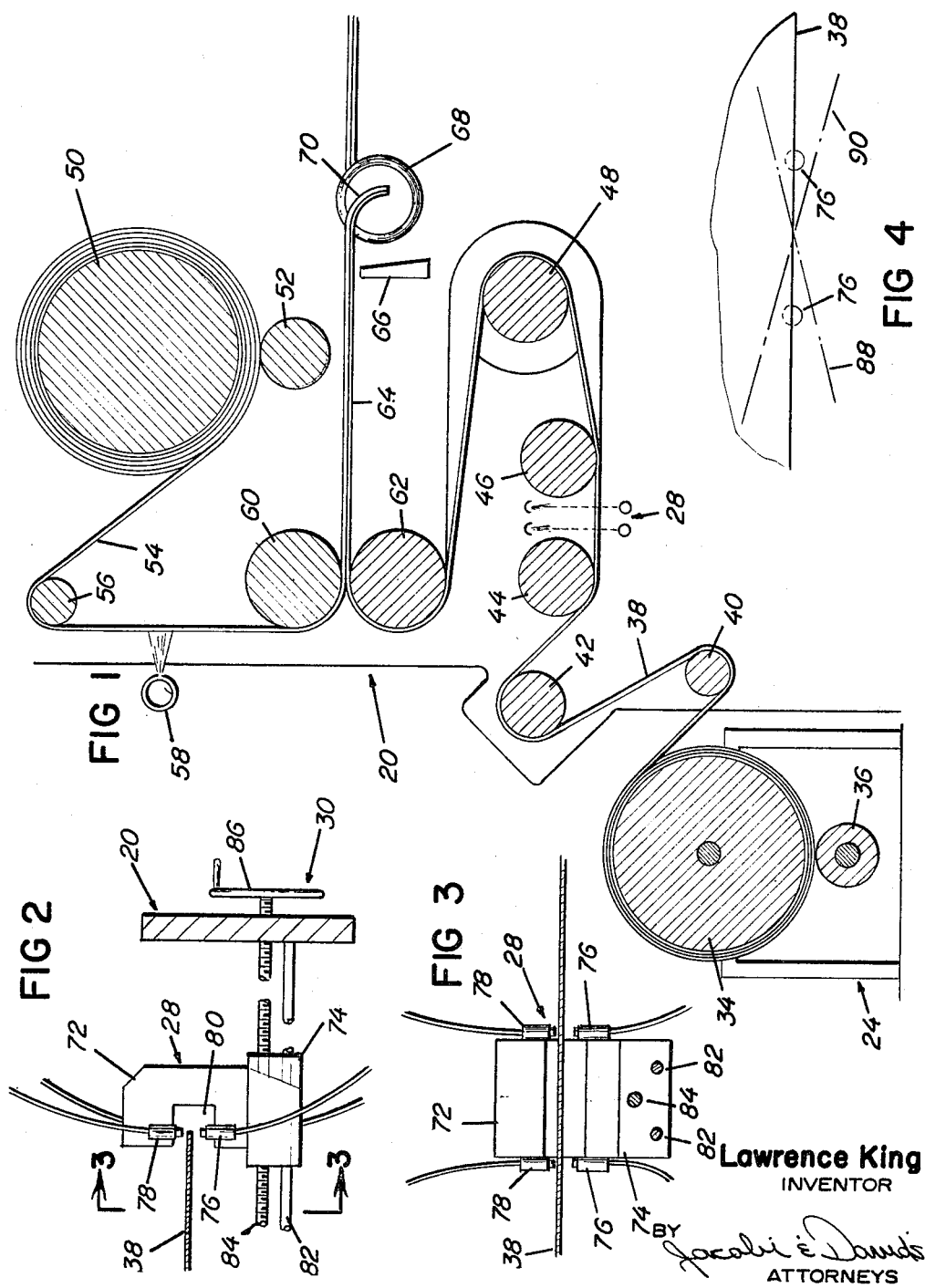

3,284,015
WEB REGISTRATION AND TENSIONING MEANS
Lawrence King, New York, N.Y., assignor to Rosfor Mills Corporation, New York, N.Y., a corporation of New York
Filed Apr. 13, 1964, Ser. No. 359,379
15 Claims. (Cl. 242—57.1)

This invention relates to a machine for laminating dissimilar materials and more particularly it relates to a machine which accurately positions the material to be laminated and which maintains a constant tension on such material.

It has been found that a foamed plastic, such as foamed polyurethane of the polyester type, can be compatibly laminated to various fabic materials, such as cloth, wool, canvas and like materials, to form a plastic-fabric lamination having utility in a variety of fields. For example, the foamed plastic layer can be suitably used as insulation material in coats and other garments, as backing material or underlay for carpeting, as padding for upholstery, and in numerous other related applications. One important reason why such foamed polyurethane and fabric laminations have achieved wide and varied acceptance is that they can be adhered directly to one another, thus eliminating the need for a separate adhesive material and thereby eliminating costly and time-consuming operations during the lamination process. Furthermore, adhesive compounds have created problems in the past since they sometimes impregnate the fabric layer and mottle its appearance and at other times they exhibit unsatisfactory properties such as the tendency to deteriorate during laundering or dry cleaning, thus making them undesirable for use in clothing. It has, therefore, been generally recognized by those in the field, that a lamination wherein foamed polyurethane and a fabric are adhered directly to one another produces several beneficial and desirable results.

In the technique of production of the aforementioned lamination, it is customary to feed the fabric web from one supply roll and to feed the foamed polyurethane web from another supply roll. The surface of the foamed polyurethane is then suitably heated to a temperature to render one of its surfaces soft and tacky and the fabric is subsequently pressed into contact with this soft and tacky surface to form the lamination. Subsequently, the edges of the laminated web are suitably trimmed and the web is folded or rolled for storage, transit or ultimate processing.

Naturally, it is important in the above-described lamination technique that the fabric web and the polyurethane web be in alignment when they are brought into engagement since non-alignment would result in a completed web wherein certain portions were not laminated. In the preferred lamination technique, the width of the two webs is substantially the same and the edges of the webs are preferably aligned when the lamination takes place. While it is not too difficult to accurately control the positioning of the polyurethane web because of its bulk, thickness and inherent rigidity, similar positioning of the fabric web presents a far different and more complicated problem. This is essentially due to the fact that the fabric has no appreciable thickness and no "body" or rigidity. Thus, the fabric must be kept under tension in order to remain taut for subsequent engagement with the polyurethane layer and while in this taut condition, its position must be accurately controlled.

The conventional arrangement for controlling the position of a travelling web in order to prevent its lateral drift is some form of edge engaging means which grips or directs the edges of the web to keep it in a straight path of travel. Sometimes these edge engaging means are rollers which contact the edges of the web to direct its travel. Another suitable edge directing means is a finite gap having air passing therethrough. As an edge passes properly through the gap, the supply of air remains at a steady pressure but if the edge moves too far into or out of the gap, the pressure is varied to return the edge to its proper position. These prior art forms of edge engaging or directing means are excellent for use with webs of steel, heavy fibre, wood and other stiff materials, but they are ineffective for use with fabric webs since the material of such webs is flimsy and tends to buckle and cannot therefore be positioned by the usual edge engaging means.

One other problem encountered in feeding fabric webs is that of maintaining constant or uniform tension on the web material in order to keep it straight, smooth and free from wrinkles and sags. While there are numerous prior art forms of constant tensioning devices, most of them are unsatisfactory for use on a web which must be adjusted in position since the tension applied to the web acts to resist any lateral movement whatsoever, even for adjustment purposes.

It is, therefore, an object of the present invention to overcome the difficulties and deficiencies associated with the prior art and to provide a lamination machine wherein the sheets to be laminated are kept in accurate alignment with one another.

Another object of the present invention is to provide means in a laminating machine for applying a constant tension and for maintaining an accurate positioning of a fabric web which is to be laminated.

Another object of the present invention is to provide a continuous and simplified operation for laminating a fabric web to a foamed polyurethane web and to provide means within that operation for substantially aligning the edges of the two webs before lamination.

Another object of this invention is to provide, within a laminating machine, a simple, inexpensive and automatic way to keep a web aligned and to maintain it under constant tension.

Numerous other objects, advantages and salient features of the invention will be appaent from the following detailed description, which, taken in connection with the annexed drawings discloses a preferred embodiment thereof.

Referring to the drawings:

FIGURE 1 is a side elevational schematic view of a laminating machine in accordance with the present invention;

FIGURE 2 is a fragmentary end view of the sensing means utilized in the present invention;

FIGURE 3 is a side view taken substantially along line 3—3 of FIGURE 2;

FIGURE 4 is a fragmentary plan view of various positions of the web within the sensing means;

FIGURE 5 is a perspective view of the carriage positioning means utilized in the present invention;

FIGURE 6 is a schematic sectional view of the carriage positioning means of FIGURE 5;

FIGURES 7 and 8 are fragmentary sectional views showing alternate valve positions of that valve shown in FIGURE 6;

FIGURE 9 is a perspective view of the carriage means and the constant tensioning means; and, FIGURE 10 is a plan view of the friction brake means utilized as a constant tensioning means.

In accordance with the principles of the present invention and as can be seen generally from the various figures in the drawings, there is provided a frame means generally designated 20 with a friction brake means generally designated 22 mounted thereon, a carriage means generally designated 24 for supporting a roll of fabric material, guide means generally designated 26 for movably supporting the carriage means, sensing means generally designated 28 for scanning the fabric material, adjustment means generally designated 30 for adjusting the sensing means, and carriage positioning means generally designated 32 for moving the carriage means.

Referring now to FIGURE 1, it can be seen that a pay-off coil or supply roll 34 of fabric material is rotatably supported by a support roll 36 within the carriage means 24. A web or sheet 38 of this fabric material is fed off the roll 34 and past a series of roller means supported by the frame 20. These roller means include an idler roll 40 around which the web 38 passes before feeding around a tensioning roller 42 which applies a constant tension to the web in a manner to be presently described. The web 38 passes from the tensioning roller 42 and across a pair of spaced idler rolls 44 and 46 between which the sensing means 28 is located. The web 38 then feeds around a slat expander 48 and toward the laminating rolls.

Also mounted on the frame 20 is a supply roll 50 of foamed polyurethane sheet which is rotatably supported by a support roll 52 to feed a web 54 of the foamed polyurethane around an idler roll 56 and toward the laminating rolls. Before the web 54 reaches the laminating rolls, it passes a heating means 58 which functions to render one surface of the web soft and tacky. The heating means can be a radiant gas burner, a hot air source, or any other suitable heating device which elevates the surface temperature of the polyurethane web to a point at which at least one surface of the web becomes soft and tacky.

The heated polyurethane web 54 and the fabric web 38 are then fed between the laminating rolls which are comprised of a pair of rotatably mounted spaced nip rollers 60 and 62. These rollers bring the heated surface of the polyurethane web 54 into contact with the fabric web 38 and apply pressure, thus adhering the two webs together to form a single laminated web 64. The soft, tacky surface on the web 54 acts as a hot melt adhesive which serves to bond the two webs 38 and 54 into a single unified laminated web 64. This laminated web is passed over a suitable cooling nozzle 66 which directs a cooling medium such as air onto the web to properly cool it. Due to the pressure applied by the laminating rolls 60 and 62, the foamed polyurethane is sometimes squeezed outward and this tends to create ragged edges on the laminated web 64. To remedy these ragged edges and to provide a laminated web having square, aligned and uniform edges, rotary slitting knives 68 are provided in the path of the web 64. These knives cut the ragged edges 70 from the laminated web as it feeds past them, and the web is then suitably wrapped into a coil, not shown, to be stored preparatory to its ultimate use.

In order to assure that the fabric web 38 is properly positioned for aligned lamination with the polyurethane web 54, a sensing means 28 is provided for sensing the edge alignment of the web 38. This sensing means is illustrated in FIGURES 2 and 3 wherein it can be seen that the sensing means includes a C-shaped bracket 72 mounted within a base support 74. Photocell means including a light source 76 and a photo-electric cell 78 are mounted on each side of the bracket 72 and a spaced apart distance corresponding substantially to the gap 80 within the bracket 72. The edge of the web 38 passes through the gap 80, as shown in FIGURES 2 and 3, perpendicularly to the photocell means. When properly positioned, the edge of the web 38 intersects the photocell means medially thereof, as shown in FIGURE 4, wherein the lamps 76 are approximately half covered by the web but are still capable of activating or triggering their associated photoelectric cells 78.

To assure that the web 38 is initially positioned correctly with respect to the sensing means, the adjustment means 30 is provided for moving the sensing means 28 relative to the web 38. The adjustment means 30 is mounted in the frame means 20 and includes a pair of elongated spaced guide rods 82 and an elongated threaded rod or screw 84, all extending beneath the web 38 in spaced parallel juxtaposition thereto. The base support 74 is provided with a pair of spaced openings for accommodation of the guide rods 82 and with a threaded aperture which engagingly receives the screw 84. The outer end of the screw 84 extends through the frame 20 and is suitably attached to a manually operable handwheel 86 which, when turned, causes the base support 74 and thus the whole sensing means 28 to move inwardly or outwardly along the threaded screw 84. The guide rods 82 assure that no angular movement can occur and that the sensing means 28 will only move transversely to said web. It can thus be seen that for each new roll 34 of fabric material, the adjustment means 30 can be manually operated to move the edge of the fabric web 38 to its proper position within the gap 80 of the sensing means 28.

When the web 38 has initially been properly positioned within the gap 80 by proper manipulation of the adjustment means 30, the lamination operation may commence with the assurance that the web 38 is properly aligned. During the lamination operation, however, it is possible for the web to become misaligned and such misalignment will result in the web edge within the gap 80 moving from its proper position as shown in FIGURE 4 and into a position as shown by the phantom lines 88 or 90 wherein the web overlies only one of the two spaced photocell means.

When such web misalignment occurs, the carriage positioning means 32, as illustrated in FIGURES 5 and 6, operates to move the carriage means 24 and restore the web 38 to its proper position. The carriage means itself, as can be seen from FIGURES 1 and 9, includes an open frame 92 which is adapted to contain and support the supply roll 34 of fabric material. The carriage frame 92 is movably supported by the guide means 26 which includes a plurality of spaced rotatably mounted wheels 94 affixed to the undersurface of the frame 92, and rails 96 beneath the carriage and upon which the wheels 94 can ride. The carriage positioning means 32 is connected to the carriage means 24 to move it back and forth upon the guide means 26.

The carriage positioning means 32 includes an electrically responsive valve means generally designated 98 which is controlled by the sensing means 28. The valve means 98 selectively admits air to an air operated ram means generally designated 100 and formed of a cylinder 102 with a piston 104 reciprocable therein. As shown in FIGURES 5 and 6, the air operated ram means 100 is suitably mounted upon the frame means 20, such as by a bracket 106, and in spaced alignment from the ram means 100 is a liquid operated cylinder and piston means generally designated 108 which is also mounted by a bracket 106. The means 108 is also formed of a cylinder 110 having a piston 112 reciprocable therein. A connecting means in the form of a common piston rod 114 couples or links the pistons 104 and 112 together for common and simultaneous movement. The piston 104 is mounted on one end of the rod 114 and at its other end, the rod is affixed to a link 116 which couples the carriage positioning means 32 to the carriage frame 92.

The piston and cylinder means 108 is filled with liquid or hydraulic fluid to permit it to act as a shock absorber or dashpot for dampening any kick-back or transient response from movement of the ram means piston 104. A conduit 118 interconnects to opposite sides of the piston 112 to form a closed hydraulic circuit in which fluid transfer occurs in response to movement of the piston. A restriction in the form of an adjustable valve 120 is provided in the hydraulic circuit to vary the rate of flow of the fluid within the cylinder 110 and to thereby vary the rate of movement of the piston 112. For example, if the valve 120 is opened quite wide, movement of the piston 112 will be easier due to less hydraulic resistance within the conduit 118. If the valve 120 is nearly closed, the movement of the piston 112 will be much more difficult because of the hydraulic resistance within the conduit 118. Thus, at the beginning of each laminating operation, the valve 120 is adjusted to provide the desired response characteristics. Then, during operation, when the sensing means 28 causes the air operated piston 104 to shift in one direction, the hydraulic piston 112 will shift in the same direction but will resist any tendency to kick-back or move oppositely to the desired direction. The amount of resistance of the piston 112 to such kickback is directly proportional to the setting of the valve 120.

The electrically responsive valve means 98 is linked directly to the sensing means 28 and is operative in direct response thereto, as shown in FIGURES 6 through 8. The valve means itself can be any suitable four-way linearly movable valve, but for purpose of illustration, a valve means is shown having a body 122 and a three spool valve member slidable within the body. The valve member includes a common piston rod 124 having elongated ends extending beyond the body 122 and three spools or pistons 126, 128 and 130 mounted upon the rod within the body. The valve means 98 is connected to the ram means 100 by two conduits 132 and 134 which interconnect the valve body 122 with the cylinder body 102. The conduits 132 and 134 are provided with enlarged ports 136 and 138 respectively at their interconnection with the valve body 122. Air is supplied to the valve means 98 from a suitable source, not shown, by means of a conduit 140 having an integral branch 142, both of which interconnect with the valve body 122. Air is discharged through the valve means by a suitable conduit 144 which is spaced between the conduit 140 and its branch 142 and which is provided with an enlarged port 146.

The outer ends of the valve piston rod 124 are electrically connected to the sensing means 28 to provide responsive movements of the valve member and thus to vary the air flow to the ram means 100. The photoelectric cells 78 are interconnected to suitable amplifier means 148 which in turn operate windings or solenoid coils 150 connected to the ends of the piston rods. When a photo-electric cell 78 is activated by light rays from its associated lamp 76, an electrical response is produced and this response is amplified by the amplifier means 148 and transmitted to the associated coils 150. When the coils 150 are thus actuated, they exert a pull on the contained valve piston rod 124, thus causing the valve member to slide within the valve body.

When the web 38 is properly positioned and aligned, as shown in FIGURE 4, both photocells are activated and the valve means 98 assumes a neutral position, as shown in FIGURE 6. In this neutral position, air under pressure flows through the conduit 140, the enlarged port 136, the condiut 132 and into the interior of the ram means 100 to apply pressure to one side of the piston 104. Simultaneously, air under pressure flows through the branch 142, the enlarged port 138, the conduit 134 and into the interior of the ram means 100 to apply pressure to the opposite side of the piston 104.

The piston 130 within the valve means 98 blocks off the port 146 and the discharge conduit 144. It can thus be seen that pressurized air is applied to opposite surfaces of the piston 104, thus putting the ram means 100 in a neutral position and aligning the carriage means 24 in its preferred position.

When the web 38 becomes misaligned to a position as illustrated by line 90 in FIGURE 4, it becomes necessary to shift the carriage means 24 to bring the web back into alignment. Such a shift is automatically accomplished by the sensing means 28 and the carriage positioning means 32. It will be noted that only one photocell is exposed since the other is covered by the web 38. The exposed photocell activates its associated coils or windings 150 to move the valve to the position shown in FIGURE 7. In this position, the branch 142 is entirely blocked off by the piston 128 and all incoming air passes through the conduit 140, through the enlarged port 136, through the conduit 132 and into the ram means 100 to push upon the left hand face of the piston 104, as it is shown in FIGURE 6. This causes the piston to move to the right and thus push air out through the conduit 134, through the enlarged ports 138 and 146, and out the outlet conduit 144. Since the piston 104 is moved to the right, the rod 114 is also moved to the right, and the link 116 connecting the rod 114 to the carriage frame 94 also moves to the right. This results in the carriage means 24 being moved along the guide means 26 a sufficient distance to restore the web to its proper position. At this time the other photocell means becomes uncovered and transmits a signal to its associated coil to move the valve back to its neutral position as shown in FIGURE 6. When the valve returns to its neutral position, the piston 104 is also returned to its neutral position. The dashpot means 108 acts as a fluid dampener to assure that the carriage means does not jerk forward or backward sharply as the ram piston 104 is reciprocated.

In view of the foregoing matter, it is obvious that if the web 38 is misaligned in the other direction, as shown by the line 88 in FIGURE 4, the valve means 98 will function exactly oppositely to move the carriage means the other way. Thus, the valve will move to the position shown in FIGURE 8 and the air pressure will be exerted on the right hand face of the piston 104 shown in FIGURE 6. This will cause the carriage means 24 to move to the left until the web 38 again becomes properly positioned. The liquid operated piston and cylinder means 108 not only assures that the carriage means starts, stops, and moves smoothly, but also assures that overshoot or overcorrection will not occur in re-positioning the web. This is important since, if the web is misaligned to the position of line 88 in FIGURE 4, the correction in position should only be sufficient to move the web back to its proper position and should not cause it to overshoot its proper position and become misaligned in the opposite direction to the position of line 90 in FIGURE 4.

A suitable source 152 of oil or other suitable lubricating fluid can be provided in conjunction with the carriage positioning means 32, as shown in FIGURE 5. The source 152 supplies droplets or a mist of oil to the incoming air through the conduit 140 and the oil is transferred to the interior of the valve means 98 and ram means 100 to lubricate the interior slidable parts. The oil can be entrained in the incoming air by aspiration, by an aerosol spray or by another suitable form of dispersion.

As one further feature of the present invention, friction brake means 22 is provided to assure that the web 38 is always under constant tension. The friction brake means 22, shown in FIGURES 9 and 10, is suitably mounted on the frame 20 and includes a housing 154 having a pair of relatively movable friction members or discs 156 and 158 movably mounted therein. The disc 156 has a short stub shaft 160 which extends outside the housing through an aperture in one of its walls and a sprocket 162 is mounted on the end of this shaft. The sprocket 162 is linearly spaced away from a similar sprocket 164 which is formed upon or attached to the tensioning roller 42. A chain or link drive 166 interconnects the two sprockets together to form an arrangement wherein the member 156 rotates responsively with the tensioning roller 42.

The member 158 is suitably keyed or otherwise interconnected with the walls of the housing 154 to prevent it from rotating. However, the member 158 is slidable within the housing, toward and away from the member 156. A conduit 168 supplies air or other suitable pressurized fluid to the outer face of the member 158 and an adjustable valve 170 is connected in the conduit 168 to vary the flow rate therethrough. In operation, the valve 170 is adjusted to allow a certain flow rate through the conduit 168. This flow moves the member 158 a certain distance inward toward the member 156. Since the member 156 rotates while the member 158 does not, a certain friction is created between their juxtaposed surfaces and this friction increases as the space between the members decreases. Thus, by suitable adjustment of the valve 170, the friction to be created can also be adjusted. This friction puts a constant pull or tension on the roller 42 by means of the chain 166, and assures that the tensional effects of the roller 42 on the web 38 will remain constant regardless of the position of the web 38 or its supply roll 34.

It can thus be seen that the present invention provides a means for automatically controlling both the position of a web to be laminated and the tensional force acting upon that web. When a new supply roll 34 of fabric material is inserted into the carriage means 24, there are three manual adjustments which must be made before laminating can proceed. First, the adjustment means 30 must be manually adjusted to assure that the edge of the web 38 is positioned properly within the gap 80 of the sensing means 28. Second, the valve or restriction 120 within the piston and cylinder means 108 is suitably adjusted to control the response characteristics of the closed hydraulic circuit. Third, the valve 170 is suitably adjusted to control the frictional effects within the friction brake means 22 and to thus assure that the tensioning roller 42 applies a constant tension to the web 38. When these three adjustments have been performed, the web 38 can be laminated with the assurance that it will always be accurately positioned and under constant tension.

After reading the foregoing detailed description, it should be apparent that the objects set forth at the outset of this specification have been successfully achieved.

Accordingly, what is claimed is:

What is claimed is:

1. In a laminating machine, the combination comprising:
    (a) frame means;
    (b) roller means on said frame means for receiving sheet material and moving the material in a given direction for processing thereof;
    (c) said roller means including at least one tensioning roller receiving material thereabout;
    (d) fluid operated friction brake means coupled to said tensioning roller to permit rotation of said tensioning roller by material in contact therewith only when the rotational force exerted on said tensioning roller by the material passing thereabout exceeds a predetermined value;
    (e) carriage means for supporting a roll of sheet material thereon to be fed in said given general direction to said roller means;
    (f) guide means supporting said carriage means for reciprocal movement along a path extending transverse to said general direction;
    (g) sensing means for sensing the position of material on said roller means which has passed said tensioning roller and producing an electrical output signal when such material is improperly positioned on said roller means, said sensing means comprising a base support and photocell means on said support;
    (h) adjustment means fixed relative to said frame means and cooperating with said support to mount said support for movement parallel to the path of movement of said carriage means whereby said support and the photocell means carried thereby can be positioned selectively in said frame means for different proper material positions on said roller means;
    (i) carriage positioning means for moving said carriage means along said path of movement thereof to restore material to the proper position as sensed by said sensing means, said carriage positioning means including an air operated ram means, a liquid operated piston and cylinder means, and electrically responsive valve means for controlling a supply of air to said air operated ram means;
    (j) said valve means being connected to said sensing means for operation of said air operated ram means in response to production of said electrical output signal by said sensing means;
    (k) said liquid operated piston and cylinder means including a closed hydraulic circuit means coupling the interior of said cylinder on opposite sides of the path of movement of said piston therein, said circuit means having a restriction therein for controlling the flow of liquid between opposite sides of said piston whereby the movement of said piston in said cylinder is controlled by said liquid; and,
    (l) connecting means coupling said air operated ram means with said piston, and said ram means with said carriage means, whereby operation of said ram means moves said carriage means under the control of said piston and cylinder means.

2. In a laminating machine, the combination comprising:
    (a) frame means;
    (b) roller means on said frame means for receiving sheet material and moving the material in a given direction for processing thereof;
    (c) carriage means for supporting a roll of sheet material thereon to be fed in said given general direction to said roller means;
    (d) guide means supporting said carriage means for reciprocal movement along a path extending transverse to said general direction;
    (e) sensing means for sensing the position of material on said roller means and producing an electrical output signal when material is improperly positioned on said roller means, said sensing means comprising a base support and photocell means on said support;
    (f) adjustment means fixed relative to said frame means and cooperating with said support to mount said support for movement parallel to the path of movement of said carriage means whereby said support and the photocell means carried thereby can be positioned selectively in said frame means for different proper material positions on said roller means;
    (g) carriage positioning means for moving said carriage means along said path of movement thereof to restore material to the proper position as sensed by said sensing means, said carriage positioning means including an air operated ram means, a liquid operated piston and cylinder means, and electrically responsive valve means for controlling a supply of air to said air operated ram means;
    (h) said valve means being connected to said sensing means for operation of said air operated ram means in response to production of said electrical output signal by said sensing means;
    (i) said liquid operated piston and cylinder means including a cylinder, a piston reciprocal in said cylinder and closed hydraulic circuit means coupling the interior of said cylinder on opposite sides of the path of movement of said piston therein, said circuit means having a restriction therein for controlling the flow of liquid between opposite sides of said piston whereby the movement of said piston in said cylinder is controlled by said liquid; and, (j) connecting means coupling said air operated ram means with said piston, and said ram means with said carriage means, whereby operation of said ram means moves said carriage means under the control of said piston and cylinder means.

3. The combination defined in claim 2 wherein said carriage means comprises a frame, and wherein said guide means comprises a pair of rails, and wheels carried on said frame and engaging said rails.

4. The combination defined in claim 3 wherein said photocell means comprises a pair of spaced apart photocell units aligned on said support perpendicularly to said path of movement.

5. The combination defined in claim 4 wherein said adjustment means comprises an elongated screw mounted in said frame means parallel to said path of movement, and wherein said support has a threaded portion thereon engaged with said screw.

6. The combination defined in claim 5 wherein said air operated ram includes a reciprocal piston member wherein said air operated ram and said liquid operated piston and cylinder means are disposed in end-to-end alignment, and wherein said connecting means comprises a common rod member linking said reciprocal piston member in said ram and said piston of said piston and cylinder means.

7. The combination defined in claim 6 wherein said closed hydraulic circuit means comprises a selectively adjustable valve providing said restriction.

8. The combination defined in claim 2 wherein said photocell means comprises a pair of spaced apart photocell units aligned on said support perpendicularly to said path of movement, wherein said adjustment means comprises an elongated screw mounted in said frame means parallel to said path of movement, and wherein said support has a threaded portion thereon engaged with said screw.

9. The combination defined in claim 2 wherein said air operated ram includes a reciprocal piston member wherein said air operated ram and said liquid operated piston and cylinder means are disposed in end-to-end alignment, and wherein said closed hydraulic circuit means comprises a selectively adjustable valve providing said restriction.

10. In a laminating machine, the combination comprising:

(a) frame means;
(b) roller means on said frame means for receiving sheet material and moving the material in a given direction for processing thereof;
(c) said roller means including at least one tensioning roller receiving material thereabout;
(d) fluid operated friction brake means coupled to said tensioning roller to permit rotation thereof by material in contact therewith only when the rotational force exerted on said tensioning roller by the material passing thereabout exceeds a predetermined value;
(e) carriage means for supporting a roll of sheet material thereon to be fed in said given general direction to said roller means;
(f) guide means supporting said carriage means for reciprocal movement along a path extending transverse to said general direction;
(g) sensing means for sensing the position of material on said roller means and producing an electrical output signal when material is improperly positioned on said roller means; and
(h) carriage positioning means for moving said carriage means along said path of movement thereof to restore material to the proper position as sensed by said sensing means, said carriage positioning means including electrically actuable control means responsive to said electrical output signal for controlling the movement of said carriage.

11. The combination defined in claim 10 wherein said fluid operated friction brake means comprises a breaking device including a pair of members, one of said members being drivingly linked to said tensioning roller, and the other of said members being movable into friction engagement with said one member under fluid pressure.

12. The combination defined in claim 10 wherein said brake means comprises a sealed housing, a first member rotatably mounted in said housing, a shaft fixed to said first member for rotation therewith, said shaft projecting from said housing, drive means connecting said shaft and said tensioning roller for simultaneous rotation thereof, a second member mounted in said housing for reciprocal movement only toward and away from said first member, said second member sealingly engaging the walls of said housing disposed peripherally thereof, and a fluid inlet to said housing communicating with the operation of said housing remote from said first member.

13. Apparatus for controlling the position of a carriage in accordance with the position of sheet material delivered therefrom, said apparatus comprising:

(a) guide means supporting said carriage for reciprocal movement along a given path extending transverse to the general direction of travel of material delivered therefrom;
(b) sensing means for sensing the position of delivered material and producing an electrical output signal when the delivered material is improperly positioned, said sensing means comprising a base support and photocell means on said support;
(c) adjustment means fixed relative to said carriage and cooperating with said support to mount said support for movement parallel to the path of movement of said carriage whereby said support and the photocell means carried thereby can be positioned selectively for different proper delivered material positions;
(d) carriage positioning means for moving said carriage along said path of movement thereof to restore material to the proper position as sensed by said sensing means, said carriage positioning means including an air operated ram means, a liquid operated piston and cylinder means, and electrically responsive valve means for controlling a supply of air to said air operated ram means;
(e) said photocell means including a pair of photocell units, one of said units producing a signal when the material is improperly positioned in one direction and the other of said units producing a signal when the material is improperly positioned in the opposite direction;
(f) said valve means being connected to said photocell units for operation of said air operated ram means in response to production of said electrical output signals by said units whereby said carriage is moved in the direction to restore the material to its proper position;
(g) said liquid operated piston and cylinder means including a closed hydraulic circuit means coupling the interior of said cylinder on opposite sides of the path of movement of said piston, said circuit means having a restriction therein for controlling the flow of liquid between opposite sides of said piston whereby the movement of said piston in said cylinder is controlled by said liquid; and
(h) connecting means coupling said air operated ram means with said piston and said ram means with said carriage whereby operation of said ram means moves said carriage means under the control of said piston and cylinder means.

14. Apparatus as defined in claim 13 wherein said air operated ram means includes spaced air couplings and a piston movable between said couplings, and wherein said valve means is operative to simultaneously open and simultaneously close the supply of air to said couplings.

15. Apparatus as defined in claim 13 wherein said closed hydraulic circuit comprises a conduit with a selectively adjustable valve therein.

References Cited by the Examiner
UNITED STATES PATENTS

| | | | |
|---|---|---|---|
| 2,078,669 | 4/1937 | King | 226—20 X |
| 2,782,030 | 2/1957 | Webster et al. | 226—21 |
| 2,818,949 | 7/1958 | Giffen | 192—18.1 |
| 2,871,013 | 1/1959 | Markey | 226—22 X |
| 3,043,532 | 6/1962 | Seiden | 226—18 X |
| 3,057,766 | 10/1962 | Dickey | 156—497 X |
| 3,071,157 | 1/1963 | Robertson et al. | 226—23 X |
| 3,082,746 | 3/1963 | Kerridge | 212—59.1 |
| 3,097,749 | 7/1963 | Hahn | 212—59.1 |

M. HENSON WOOD, Jr., *Primary Examiner.*

ROBERT B. REEVES, *Examiner.*

C. H. SPADERNA, *Assistant Examiner.*